United States Patent [19]
Srock et al.

[11] Patent Number: 5,562,329
[45] Date of Patent: Oct. 8, 1996

[54] BODY STRUCTURE OF PASSENGER CAR

[75] Inventors: Rainer Srock, Leonberg; Georg Hoetzer, Schwieberdingen; Werner Wolkersdorfer, Rutesheim; Hermann Sturm, Weissach, all of Germany

[73] Assignee: Dr.Ing. h.c.F. Porsche AG, Weissach, Germany

[21] Appl. No.: 496,000

[22] Filed: Jun. 28, 1995

[30] Foreign Application Priority Data

Jun. 28, 1994 [DE] Germany .......................... 44 22 498.2

[51] Int. Cl.⁶ .................................................. B62D 23/00
[52] U.S. Cl. ........................ 296/203; 296/30; 296/188; 296/194; 296/204
[58] Field of Search ..................... 296/29, 30, 187–189, 296/203, 204, 193, 194, 186, 209

[56] References Cited

U.S. PATENT DOCUMENTS

| | | |
|---|---|---|
| 3,321,235 | 5/1967 | Müller et al. . |
| 4,669,776 | 6/1987 | Harasaki ................... 296/194 |
| 4,804,222 | 2/1989 | Sakiyama et al. ............ 296/203 |

FOREIGN PATENT DOCUMENTS

| | | |
|---|---|---|
| 440852 | 9/1970 | Australia . |
| 0226012 | 6/1987 | European Pat. Off. . |
| 1254029 | 5/1968 | Germany . |
| 1430845 | 12/1969 | Germany . |
| 3512213C2 | 10/1986 | Germany . |
| 1754554 | 8/1992 | U.S.S.R. .................... 296/204 |
| 2087319 | 5/1982 | United Kingdom . |
| 2206085 | 12/1988 | United Kingdom . |

Primary Examiner—Dennis H. Pedder
Attorney, Agent, or Firm—Evenson, McKeown, Edwards & Lenahan, P.L.L.C.

[57] ABSTRACT

A body structure of a passenger car comprises a front wall arranged between the forward car section and the passenger compartment, two mutually spaced side rails which are each connected to a floor support which is situated behind and extends as an extension of the side rail, exterior side members, upright hinge pillars and a floor. In order to, on the one hand, provide a stiff passenger compartment and, on the other hand, absorb the forces well which occur in the case of a frontal impact and introduce these forces in a large-surface manner from the forward side rails into the adjoining, partially lower body structure, it is provided that the two lower forward side rails extend continuously to the front wall and are connected to a first cross member fitted on the exterior side onto the front wall, and in that, at the front wall, at the height of the first cross member on the side facing the passenger compartment, a second cross member is arranged which, in the center area of its transverse course, is connected with a tunnel reinforcement fitted onto the transmission tunnel, and which—viewed in the vertical direction—widens in its laterally exterior areas in the downward direction and is divided into two hollow rail sections disposed above on another. The hollow rail section disposed on top is connected to the front wall and the hinge pillar, whereas the lower hollow rail section is connected with the front wall, the side member and the floor.

18 Claims, 6 Drawing Sheets

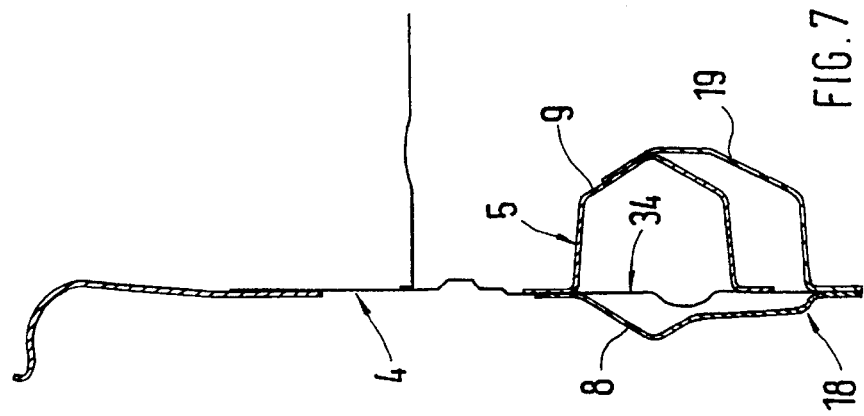
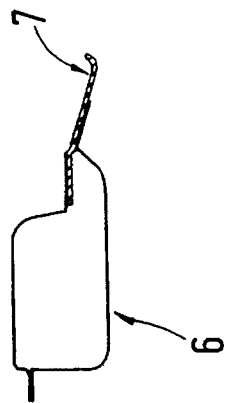
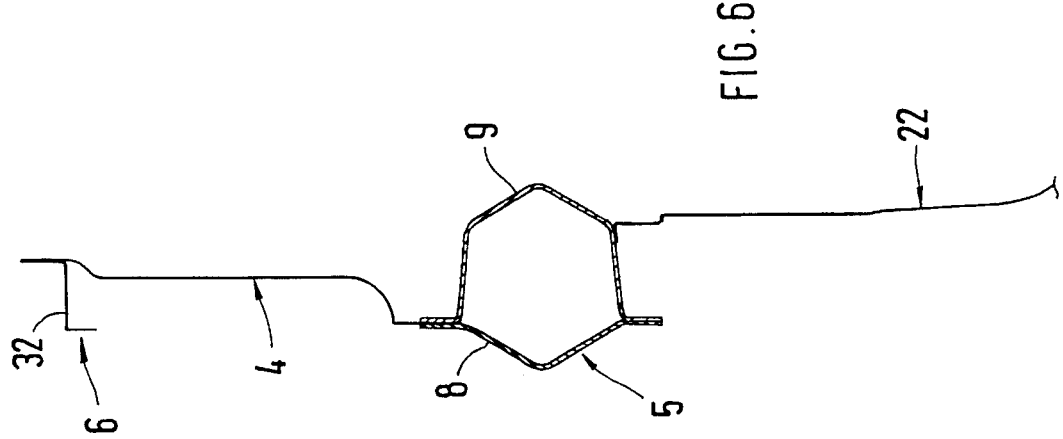

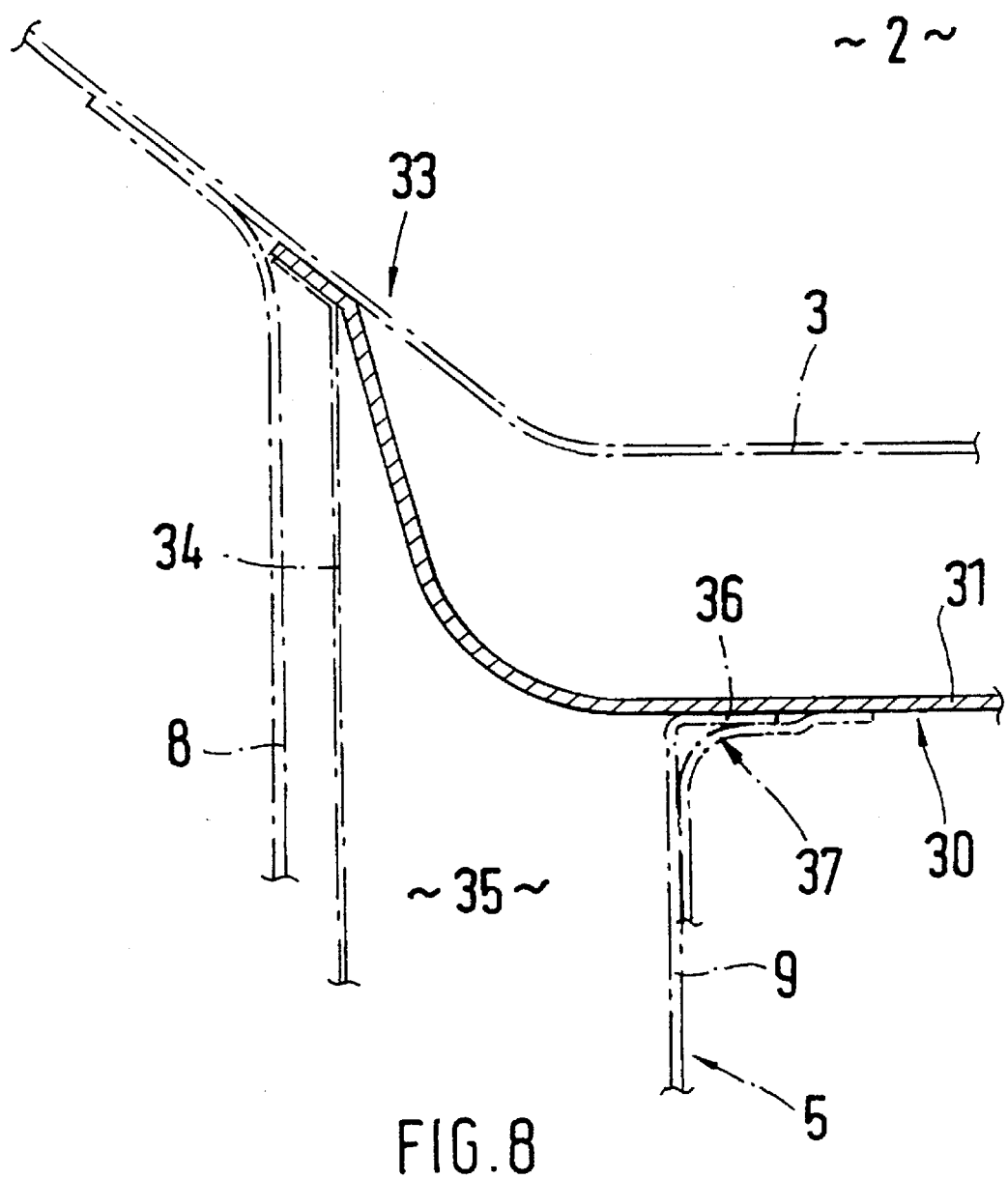

5,562,329

1

BODY STRUCTURE OF PASSENGER CAR

BACKGROUND AND SUMMARY OF THE INVENTION

This invention relates to a body structure of a passenger car having a front wall arranged between the forward car section and the passenger compartment, and two lower mutually spaced forward side rails which are each connected to a floor support.

From European Patent Document EP 0 226 012 B1, a body structure of a passenger car is known which has a front wall arranged between the forward car section and the passenger compartment and has two mutually spaced side rails which are connected to floor supports which are situated behind them and which extend as an extension of the forward side rails. The body structure also comprises laterally exterior side members, a floor and upright hinge pillars. A rearward end section of the forward side rail is connected by way of a support element with the laterally exterior side member.

It is an object of the invention to further develop the body structure in the area of a front wall, which bounds the passenger compartment, in such a manner that, on the one hand, a stiff passenger compartment is created and, on the other hand, the forces occurring during a frontal impact are absorbed well and are introduced in a large-surface manner from the forward side rails into the adjoining body structure.

This object is achieved, at least in part, by providing body structure of a passenger car comprising:

a front wall arranged between the forward car section and a passenger compartment, two lower mutually spaced forward side rails which are each connected to a floor support which is situated behind them and which extends as an extension of the side rail, laterally exterior side members, a floor, and upright hinge pillars, wherein the two lower forward side rails extend to the front wall and are connected in a force-transmitting manner with this front wall and with a first cross member fitted on an exterior side onto the front wall, wherein a second cross member is arranged on the front wall at the level of the first cross member on a side facing the passenger compartment, said second cross member being connected in a center area of its transverse course with a tunnel reinforcement placed on a longitudinally extending transmission tunnel, and wherein the second cross member, in its laterally exterior areas—viewed in a vertical direction—widens in a downward direction and is divided into two separate hollow rail sections, an upper one of the hollow rail sections being connected to the front wall, the wheel house wall and the hinge pillar, and a lower one of the hollow rail sections being connected with the front wall, the side member and the floor.

Advantages achieved by means of the invention are that, by means of the linking of the lower forward side rails to first and second front-wall-side cross-members, a favorable flow takes place of forces originating from the frontal impact because the forces are introduced from the height of the cross members into a lower support structure (front wall, floor, side member, hinge pillar) or into a reinforcing support of the transmission tunnel.

The absorption of force is positively influenced by the fact that end areas of the first transverse member facing the forward car project into the hollow space of the adjoining forward side rails and are connected to the front wall and a stiffening web plate arranged inside the side rail.

In especially preferred embodiments, the web plate, which extends downward in the direction of the floor support, extends to the front wall by means of its rearward edge and has the effect that, in the case of a crash impact, the forward side rails do not tilt away upwards. The forward side rails extend continuously to the first cross member fitted onto the front wall and are connected with it in a force-transmitting manner. A second transverse member which is arranged approximately at the same level on the side of the front wall facing the passenger compartment distributes the forces into the front wall, the wheel house walls, the side members, the upright hinge pillars and into a tunnel reinforcement placed on the transmission tunnel, whereby a stable passenger compartment is created. In lateral exterior areas, the second transverse member is divided into two hollow support sections which are connected to one another by a web-type connection area.

Other objects, advantages and novel features of the present invention will become apparent from the following detailed description of the invention when considered in conjunction with the accompanying drawings.

BRIEF DESCRIPTION OF THE DRAWINGS

FIG. 6 is an enlarged sectional view taken along Line VI—VI of FIG. 2;

FIG. 7 is an enlarged sectional view taken along Line VII—VII of FIG. 2;

FIG. 8 is an enlarged sectional view taken along Line VIII—VIII of FIG. 2.

DETAILED DESCRIPTION OF THE DRAWINGS

Figure 1:
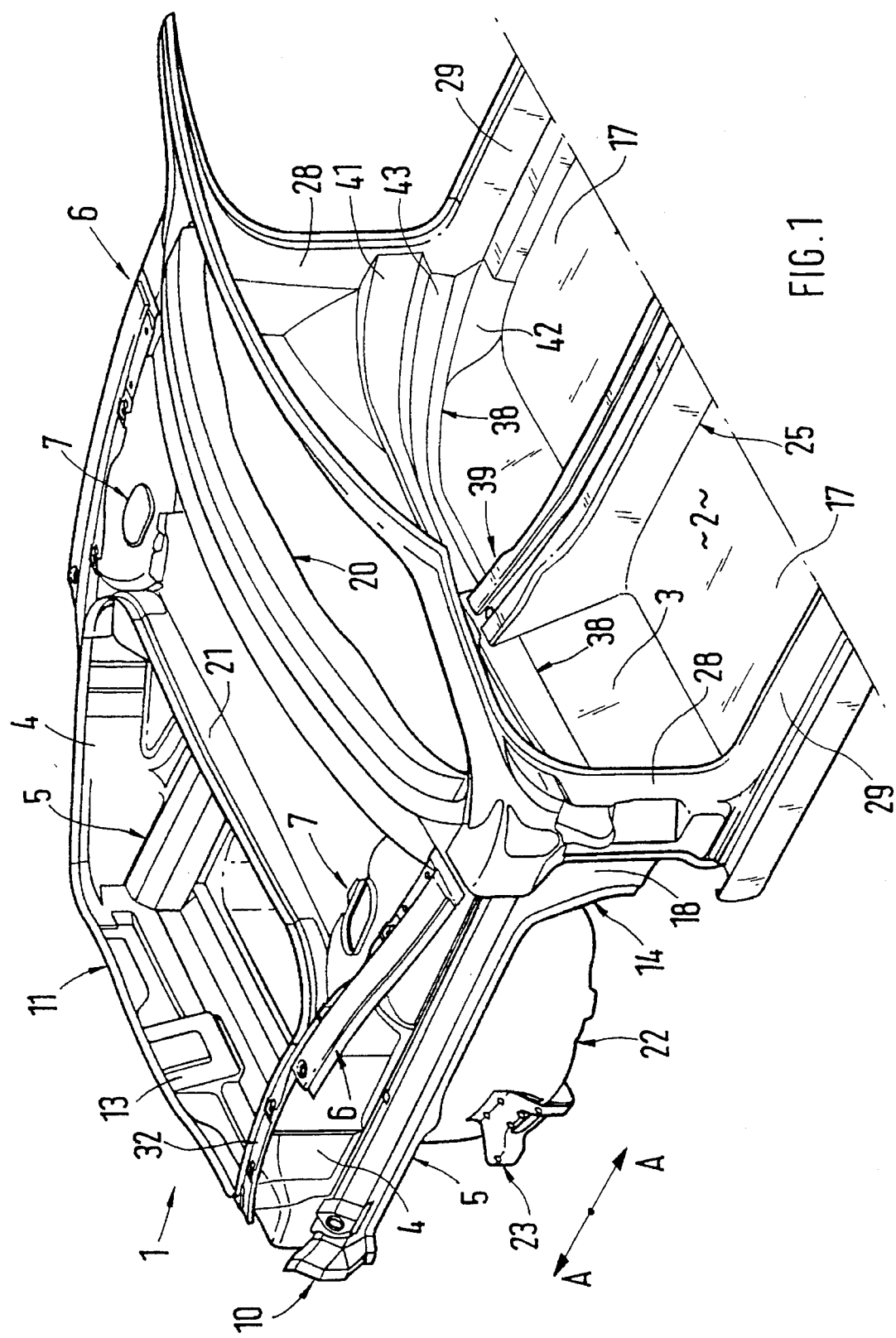
FIG. 1 is a perspective schematic view diagonally from the rear of a forward body structure of a passenger car constructed according to a preferred embodiment of the invention.
Figure 2:
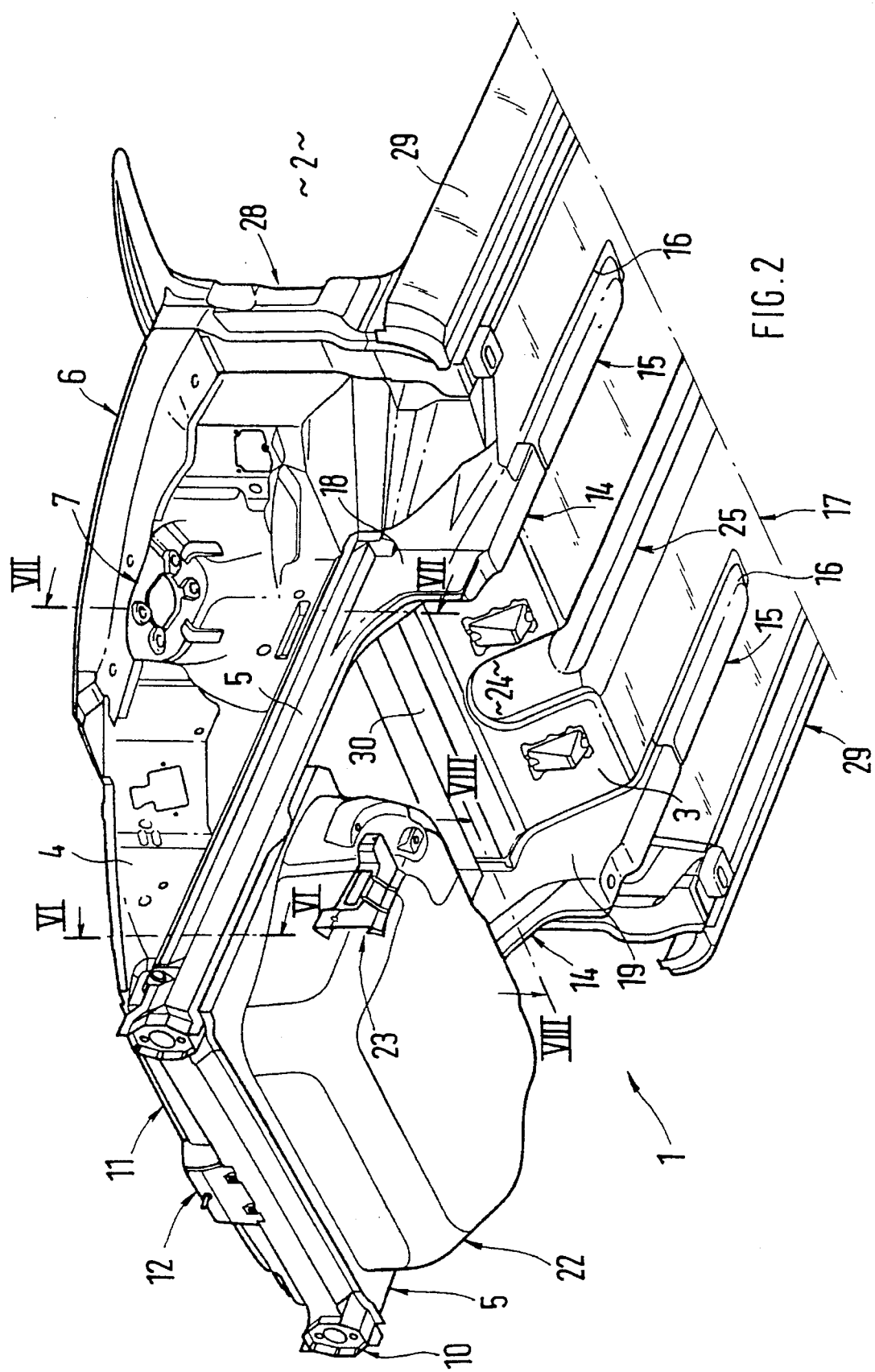
FIG. 2 is a perspective view diagonally from the front and below of the forward body structure of the passenger car of FIG. 1.
Figure 3:
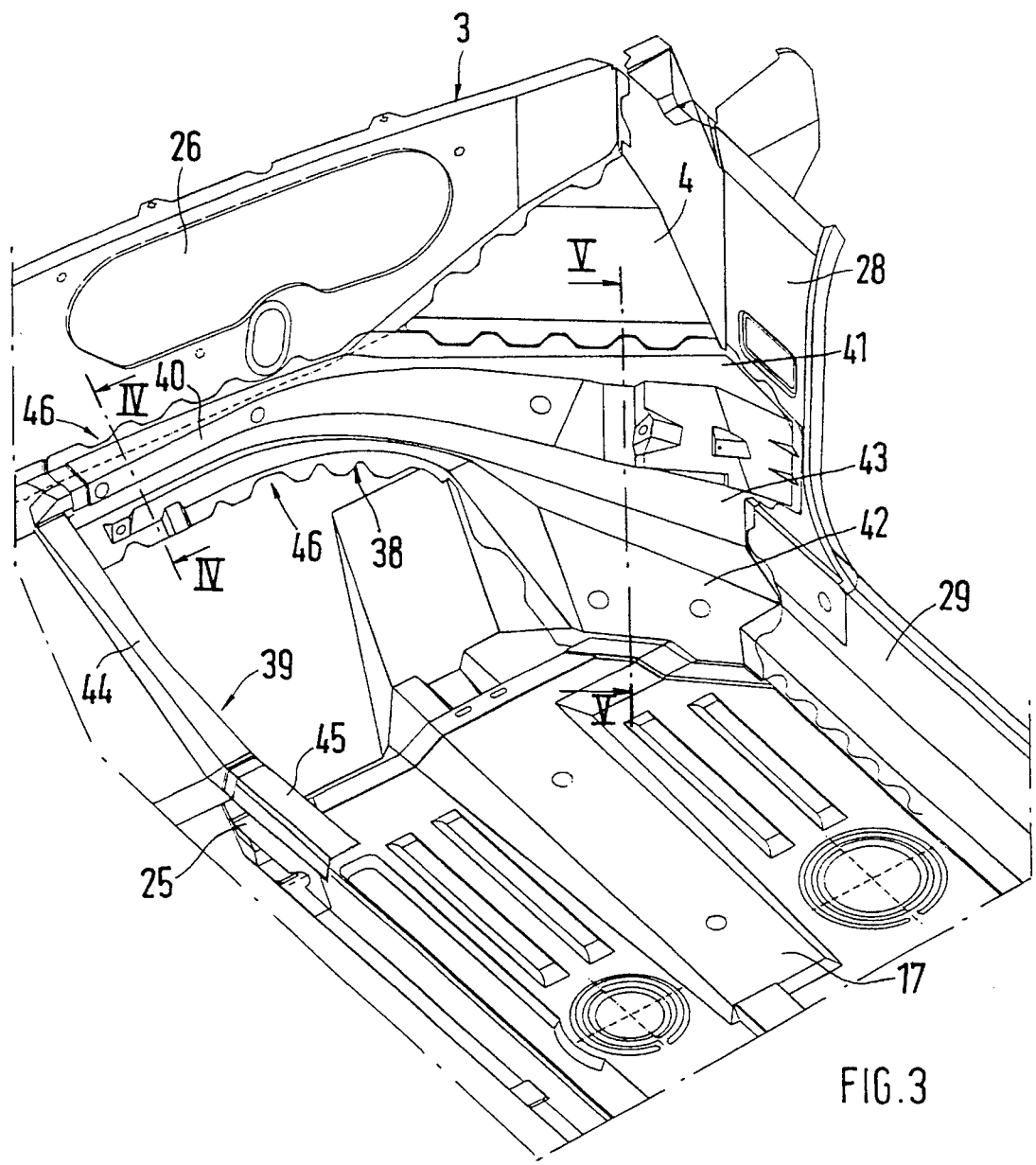
FIG. 3 is a perspective partial view from the passenger compartment of a front wall and the adjoining components of the body structure of FIG. 1.
Figure 5:
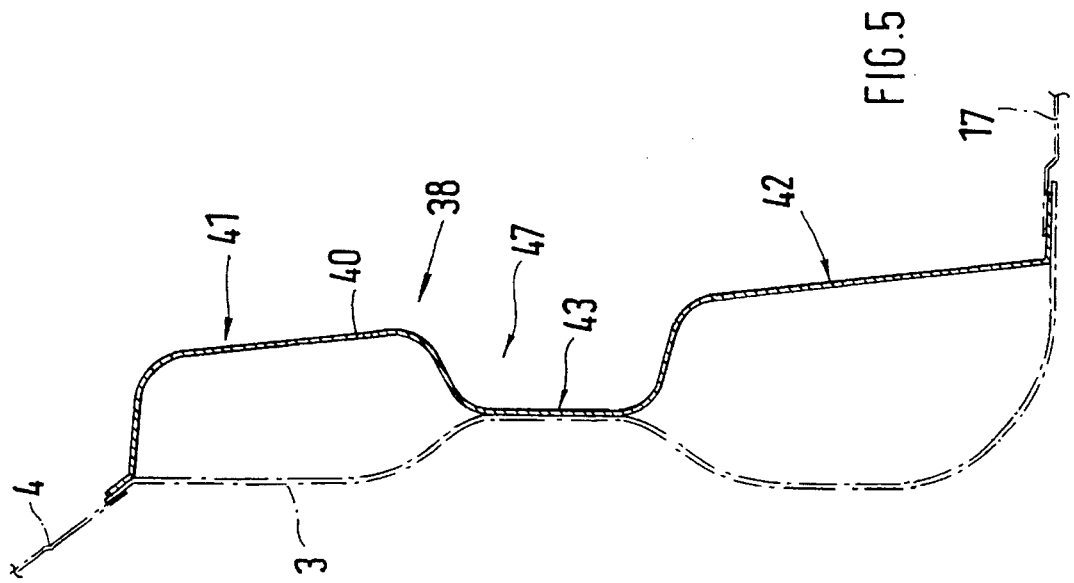
FIG. 5 is an enlarged sectional view taken along Line V—V of FIG. 3.
Figure 4:
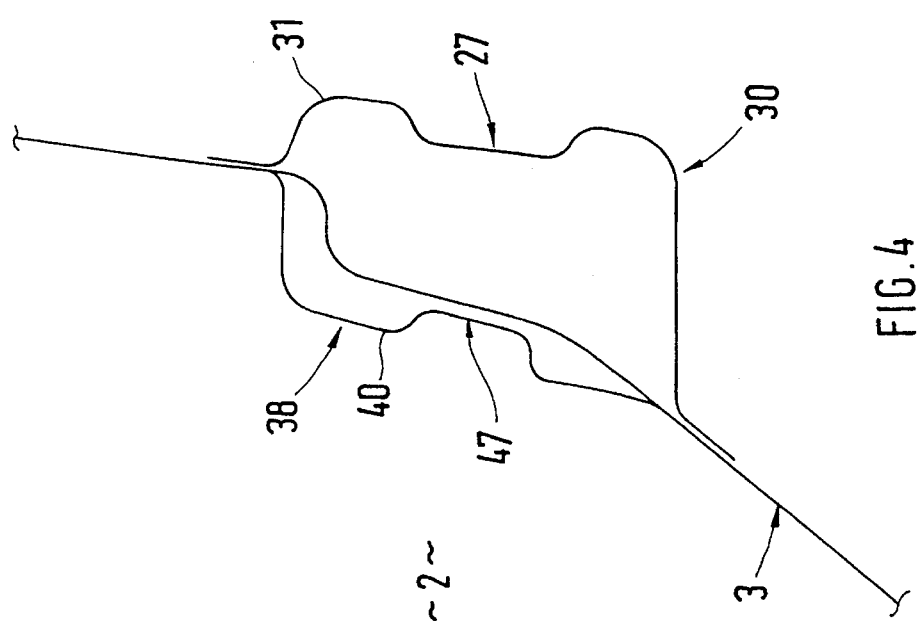
FIG. 4 is an enlarged sectional view taken along Line IV—IV of FIG. 3.

A forward body structure 1 of a passenger car is formed essentially by a front wall 3 bounding a passenger compartment 2 and by wheel house walls 4 which extend in the longitudinal direction A—A of the vehicle. A lower forward side rail 5 and an upper forward side rail 6 are connected to each wheel house wall 4. In addition, a spring strut receiving device 7 is provided in the area of each wheel house wall 4.

The lower forward side rail 5, which, viewed in the cross-section as shown in FIG. 6, has an approximately 6-cornered or 8-cornered construction, and is composed of an outer rail section 8 and an inner rail section 9 which form a closed hollow body. On its forward end, the side rail 5 has a cross-sectional widening 10 into which an impact absorber receiving device of a bumper system is inserted which is not shown in detail. The two side rails 5 are connected with one another by a forward profiled transverse member 11. In a center area of a transverse section of the cross member 11, a locking receiving device 12 and an edge plate 13 are fitted onto the cross member 11.

In a laterally exterior area, the cross member 11 reaches around the inner rail section 9 of the side rail 5 and is tightly connected with it.

Viewed in the lateral view, the side rails 5 extend in an approximately horizontally aligned manner from the forward cross member 11 continuously to the front wall 3.

In front of the front wall 3, the side rail 5 widens in the downward direction and is connected by way of a connecting support 14 to a lower bottom support 15. The bottom support 15 is formed by a metal sheet 16 which has a hat-shaped profile and is fitted onto the bottom side of the floor 17. By means of its rearward end, the connecting support 14 is connected to the front wall 3 and is composed of a one-piece molded-out section 18 of the outer rail segment 8 of the side rail 5 and a separate profiled support plate 19 (FIG. 7). However, the connecting support 14 may also be constructed in one piece with the side rail 5 or the floor support 15 according to other contemplated embodiments. In the top view, the connecting support 14 and the floor support 15, which follows, extend as a linear extension of the forward side rail 5.

A rearward end of the floor support 15 extends approximately to a seat cross member which is fitted onto the upper side of the floor 17 and is not shown, or the rearward end of the floor support 15 projects beyond this seat cross member toward the rear. A downward-projecting trough-shaped spare wheel pan 22 is connected to the two forward side rails 5, the forward cross member 11 and a transversely extending partition 21. On the exterior side of the spare wheel pan 22, holders 23, or a stiffening frame not shown in detail, are arranged locally for the fastening of a front axle, or the like.

In a center area of its transverse course, the transversely extending front wall 3 has a recess 24 to which a longitudinally extending transmission tunnel 25 is connected.

Above the transmission tunnel 25, opening 26 is formed on the front wall 3, which opening can be closed by means of a cover which is not shown in detail. On its laterally exterior end, the front wall 3 is linked to the respective adjoining, upright hinge pillar 28, specifically to its interior side.

By means of their lower ends, the upright hinge pillars 28 are placed on laterally exterior, horizontal side members 29.

Each upper side rail 6 is connected to the corresponding hinge pillar 28 and has a hollow-support-type structure from the hinge pillar 28 to shortly behind the spring strut receiving device 7. Farther to the front, only a bent flange 32 is continued on which adjoining fenders are detachably fastened (FIG. 6). At the level of the upper side rails 6, the two hinge pillar 28 are connected with one another by means of a cowl cross member 20.

A good introduction of force from the lower forward side rails 5 into the adjoining body structure 1 is achieved by the fact that the two forward, linear side rails 5 extend continually to the front wall 3 and are connected with it by means of this front wall and a first cross member 30 placed on the outside (forward exterior side) on the front wall 3 in a force-transmitting manner. The first cross member 30 is formed by a support element 31, which is placed on the front wall 3 and has an approximately hat-shaped profile. This support element 31 is connected on its laterally exterior ends 33 to the front wall 3 and a stiffening web plate 34 arranged inside the forward side rail 5 (FIG. 8). The end 33 of the first cross member 30 extends approximately to the exterior rail section 8. According to FIG. 8, the first cross member 30 extends at the height of the two side rails 5 and projects in sections into the hollow space 35 of the forward side rail 5. In a cross-sectional view, the support element 31 has a depression in a center area of its vertical course.

The inner rail section 9 ends in front of the side wall 3 and is fitted onto the cross member 30 by way of a fastening flange 36. For the reinforcement, an additional shoe 37 is placed on the interior side of the rail section and the cross member 30. Also, at the level of the first cross member 30 on the side facing the passenger compartment 2, a second cross member 38 constructed in one or two parts is arranged on the front wall 3. In a center area of its transverse course, this cross member 38 is connected in a force-transmitting manner with a tunnel reinforcement 39 placed on the top side of the transmission tunnel 25.

The second cross member 38 is formed by a profiled, one- or two-part, hat-shaped edge plate 40 which is fitted onto the front wall 3 from the direction of the passenger compartment 2 and has an indentation 47 in a center area of its vertical course.

In the diagonally extending outer areas, the second cross member 38 widens in the downward direction and is divided into two hollow rail sections 41, 42 disposed above one another. The hollow rail section 41 disposed on top is connected to the front wall 3, the wheel house wall 4 and the upright hinge pillar 28. The lower hollow rail section 42 is fixedly connected with the front wall 3, the side member 29 and the floor 17 of the body structure 1, in which case the floor 17 is placed onto the lower hollow rail section 42.

Between the two hollow rail sections 41, 42 disposed above one another, a web-shaped connecting area 43 is constructed in which the front wall 3 and a wall section of the indentation 47 of the second cross member 38 rest flatly on one another. The web-shaped connecting area 43 widens continuously—viewed in the vertical direction—in the direction of the hinge pillar 28. The web plate 34 arranged inside the forward side rail 5 extends only in the area of the connecting support 14, in which case the web plate 34 extends downward in the direction of the floor support 15 and is supported on the front wall 3.

Viewed in the longitudinal direction, the tunnel reinforcement 39 is constructed in several parts. The part 44 of the tunnel reinforcement 39 connected with the front wall 3 or the second cross member 38 extends diagonally downward and is connected to an approximately horizontally aligned, longitudinally extending section 45 of the tunnel reinforcement 39. The tunnel reinforcement 39 reaches in sections around the second cross member 38, in which case the forward, diagonally extending part 44 is used as a frontal crash support.

For reasons of weight, the common connecting flanges 45 of adjoining support plates are preferably locally recessed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Body structure of a passenger car comprising:
   a front wall arranged between the forward car section and a passenger compartment,
   two lower mutually spaced forward side rails which are each connected to a floor support which is situated behind them and which extends as an extension of the side rail, laterally exterior side members, a floor, and upright hinge pillars, wherein the two lower forward side rails extend to the front wall and are connected in a force-transmitting manner with this front wall and with a first cross member fitted on an exterior side onto the front wall, wherein a second cross member is arranged on the front wall at the level of the first cross member on a side facing the passenger compartment, said second cross member, in a center area of its transverse course, extending from a tunnel reinforcement placed on a longitudinally extending transmission tunnel, and wherein the second cross member, in its laterally exterior areas—viewed in the vertical direction—widens in a downward direction and is divided into two separate hollow rail sections an upper one of the hollow rail sections being connected to the front wall, the wheel house wall and the hinge pillar, and a lower one of the hollow rail sections being connected with the front wall, the side member and the floor.

2. Body structure according to claim 1, wherein a web-shaped connecting area is formed between the two hollow rail sections disposed above one another, the front wall and a depressed wall section of the second cross member resting flatly upon one another in the web-shaped connecting area.

3. Body structure according to claim 2, wherein the web-shaped connecting area widens continuously from the front wall in the direction of the hinge pillar.

4. Body structure according to claim 1, wherein the first cross member is formed by a support element with a hat-shaped profile which is placed onto the front wall and which is connected on its laterally exterior ends to the front wall and an upright web plate arranged inside the forward side rail.

5. Body structure according to claim 1, wherein the first cross member projects by means of laterally exterior end areas in sections into a hollow space of the forward side rails, an inner rail section of the forward side rail being fitted by means of a fastening flange on the cross member.

6. Body structure according to claim 4, wherein the first cross member projects by means of laterally exterior end areas in sections into a hollow space of the forward side rails, an inner rail section of the forward side rail being fitted by means of a fastening flange on the cross member.

7. Body structure according to claim 4, wherein a rearward end area of the web plate is supported on the front wall.

8. Body structure according to claim 1, wherein the tunnel reinforcement is constructed in several parts, in which case a part of the tunnel reinforcement connected with the front wall extends diagonally downward and is connected to an approximately horizontally aligned, longitudinally extending section of the tunnel reinforcement.

9. Body structure according to claim 1, wherein the tunnel reinforcement is sectional.

10. Body structure according to claim 8, wherein the tunnel reinforcement is sectional.

11. Body structure according to claim 1, wherein each of the two forward side rails has, a cross-sectional widening on its end facing away from the front wall, for an impact absorber receiving device.

12. Body structure according to claim 9, wherein the two forward side rails are connected with one another in an area of an impact absorber receiving device by means of a profiled cross member, and wherein a lock receiving device and an edge plate are placed on the cross member in a central area of its transverse course.

13. Body structure according to claim 10, wherein the two forward side rails are connected with one another in an area of an impact absorber receiving device by means of a profiled cross member, and wherein a lock receiving device and an edge plate are placed on the cross member in a central area of its transverse course.

14. Body structure according to claim 1, wherein a lower spare wheel pan is provided between the forward side rails, the first cross member and a transversely extending partition.

15. Body structure according to claim 12, wherein a lower spare wheel pan is provided between the forward side rails, the first cross member and a transversely extending partition.

16. Body structure according to claim 13, wherein a lower spare wheel pan is provided between the forward side rails, the first cross member and a transversely extending partition.

17. Body structure according to claim 14, wherein a front axle holder is constructed on the exterior side of the spare wheel pan.

18. Body structure according to claim 15, wherein a front axle holder is constructed on the exterior side of the spare wheel pan.

* * * * *